Oct. 14, 1952 G. N. HARCOURT 2,614,073
PROCESS OF DESOLVENTIZING MATERIALS BY DISTILLATION
Filed Sept. 30, 1949 2 SHEETS—SHEET 1

INVENTOR.
Guy N. Harcourt
by Popp and Popp
Attorneys.

Oct. 14, 1952 — G. N. HARCOURT — 2,614,073
PROCESS OF DESOLVENTIZING MATERIALS BY DISTILLATION
Filed Sept. 30, 1949 — 2 SHEETS—SHEET 2

INVENTOR.
Guy N. Harcourt
by Popp and Popp
Attorneys

Patented Oct. 14, 1952

2,614,073

UNITED STATES PATENT OFFICE 2,614,073

PROCESS OF DESOLVENTIZING MATERIALS BY DISTILLATION

Guy N. Harcourt, Buffalo, N. Y., assignor to Blaw-Knox Company, Pittsburgh, Pa., a corporation of New Jersey Application September 30, 1949, Serial No. 118,814

1 Claim. (Cl. 202—74)

This invention relates to the recovery of volatile liquids from mixtures or solutions of relatively non-volatile substances containing such volatile liquids and more particularly where it is difficult or impossible to recover such volatile liquids or relatively non-volatile substances by simple evaporation.

In the recovery of volatile liquids from mixtures or solutions of non-volatile substances, particularly a water-miscible solvent from a water-insoluble solute, it frequently is difficult or impossible to recover the volatile liquid completely by simple evaporation because the concentrate becomes viscous, coats the walls of the still or otherwise impedes the recovery process. Examples of such solutions are solutions of cellulose acetate in acetone in which the boiling point of the solvent is lower than water, and paint and resin solutions where the boiling point of the solvent may be somewhat higher than water, the invention being more particularly described in conjunction with the recovery of acetone containing cellulose acetate as the solute. Examples of mixtures, that is solids wetted with a volatile solvent, subject to recovery in accordance with the present invention are oil seed or animal residues comprising the ground solids wet with the solvent used in extracting oil or other substances therefrom.

It is accordingly the principal object of the present invention to extract volatile liquids from mixtures or solutions of solid or liquid relatively non-volatile substances containing the volatile liquid where such recovery by simple evaporation is difficult or impossible, and by a process and with apparatus in which there is substantially complete recovery of the volatile liquid and which apparatus remains clean and free from deposits throughout, in particular having freedom from any viscous concentrate tending to coat the apparatus or otherwise impede the recovery process.

Another object is to provide such a process which can be practiced as a continuous process.

Another object is to provide such a process in which water is employed as a treating liquid and which is particularly applicable to mixtures and solutions of relatively non-volatile substances immiscible with water and containing a volatile liquid other than water.

Another object is to provide such a process which can be practiced with a treating liquid other than water; in which the volatile liquid can have a lower or higher boiling point than the treating liquid; and in which the non-volatile substance can be a liquid or a solid and present as a mixture with or as the solute in the liquid being treated.

Another object is to provide such a process which can be practiced under atmospheric pressure or under higher pressures or under vacuum as may be desired.

Another object is to provide such a process in which substantial complete recovery from the material in process can be effected on shut down.

Another object is to provide such a recovery process which is simple, economical and readily controlled.

Another object is to provide such a process and apparatus in which the relatively non-volatile substance is readily separated in simple separating apparatus and in a condition for ready recovery or disposal.

Other objects and advantages of the invention will appear from the following description and drawings in which:

Fig. 4 is an enlarged vertical section through the filter forming part of the apparatus.

Figure 1:
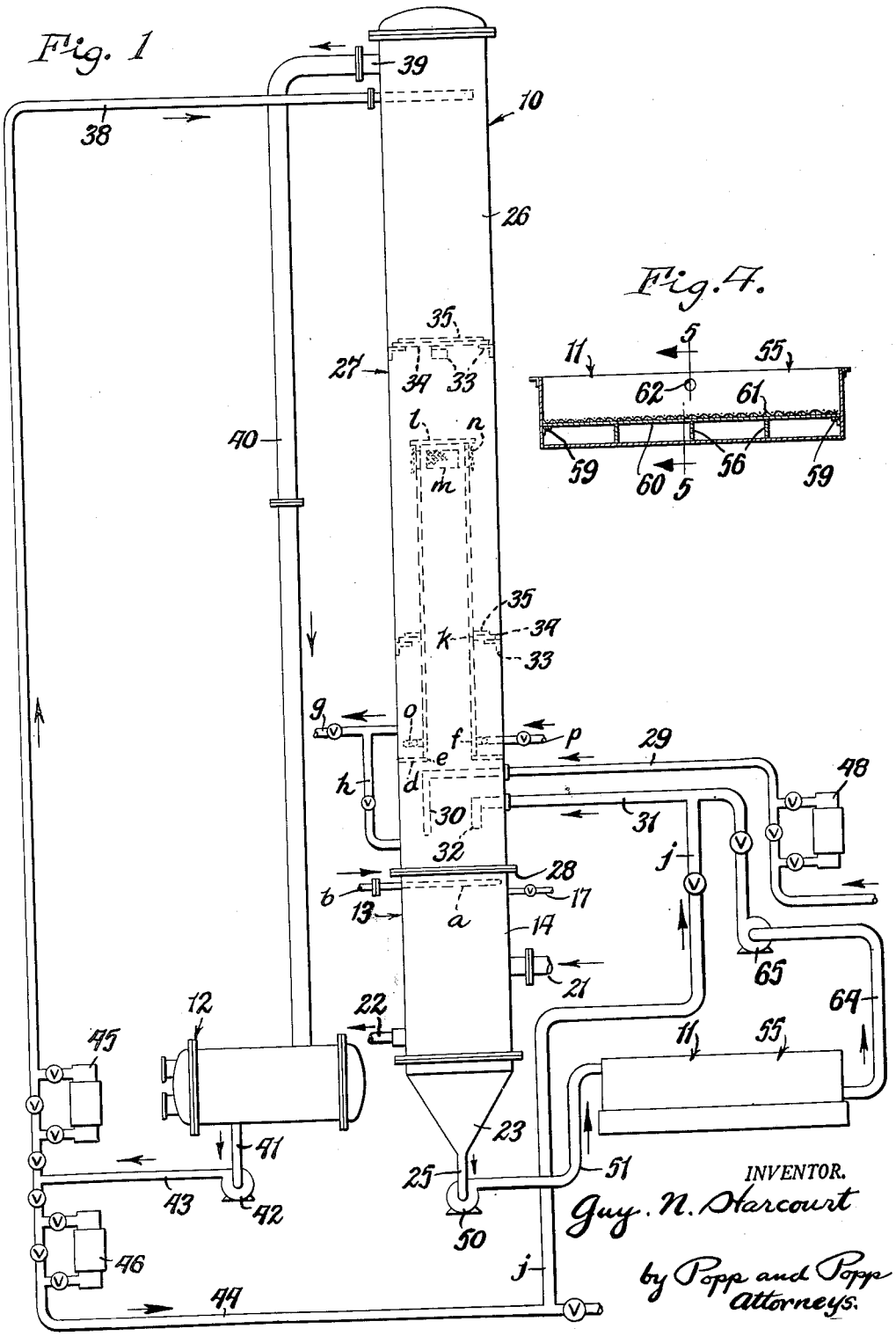
Fig. 1 is a diagrammatic representation of one form of apparatus embodying and adapted to carry out the present invention for the recovery of a volatile liquid from a mixture or solution of non-volatile substances containing a volatile liquid.
Figure 2:
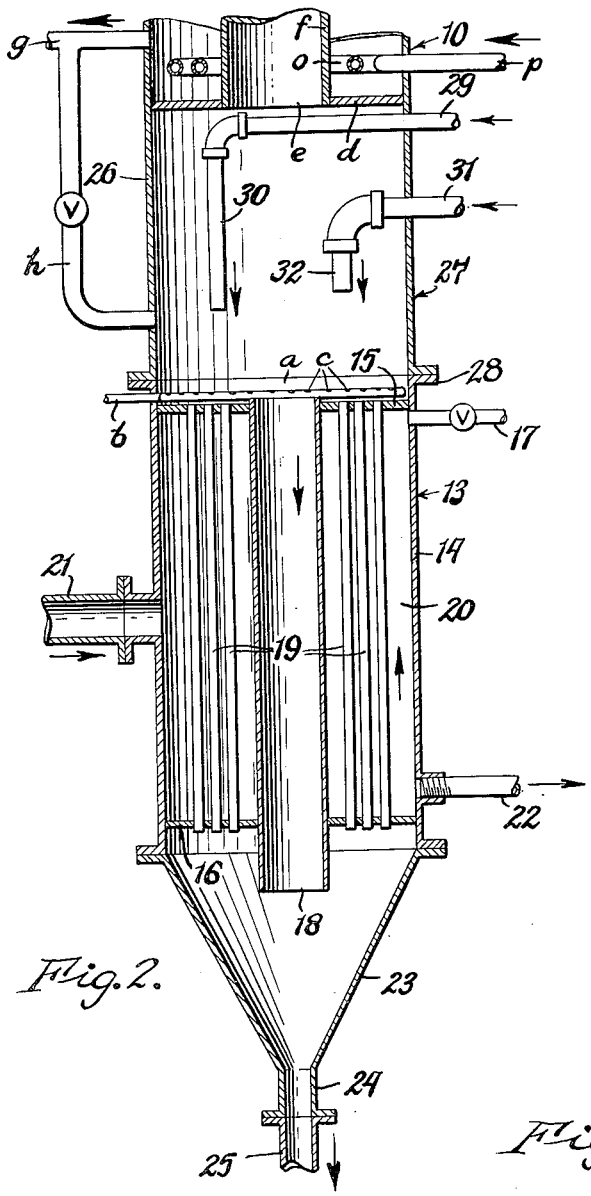
Fig. 2 is an enlarged vertical section through the lower part of the still forming part of the apparatus.
Figure 3:
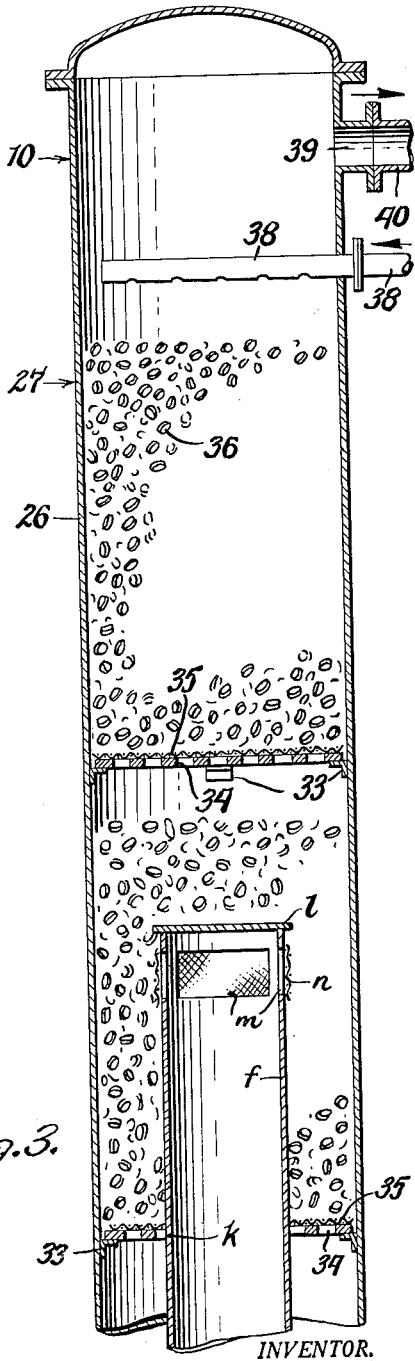
Fig. 3 is a vertical section through the upper part of the still.
Figure 5:
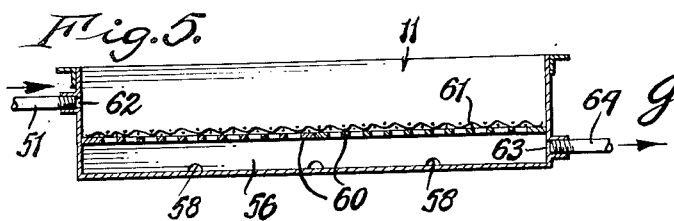
Fig. 5 is a vertical section taken on line 5—5, Fig. 4.

The present invention provides a simple and economical method for the substantially complete recovery of a volatile liquid from a mixture or solution of relatively non-volatile substances immiscible or insoluble in a treating liquid, such as water, and containing or contained in a volatile liquid other than the treating liquid, by feeding the mixture or solution to a boiling body of the treating liquid contained in a still. The feeding of the mixture or solution to the boiling treating liquid causes the volatile liquid to evaporate. This desolventizing by evaporation will generally be accompanied by liquid-phase separation in which the volatile liquid contained in the relatively non-volatile substance is displaced by the treating liquid as where the non-volatile substance absorbs the treating liquid, such as water, preferentially to the volatile liquid. Evaporation may proceed first or simultaneously, the order depending partly on the detention time necessary to exchange the liquids absorbed and the volatility of the voltaile liquid. In addition to desolventizing by such evaporation and liquid-phase displacement, the mixture or solution can be simultaneously desolventized by extraction in which the volatile liquid is dissolved by the treating liquid in which the non-volatile substance is immiscible or insoluble. The process forming the subject of the present invention can therefore involve combinations of all three of the basic desolventizing processes, namely evaporation, liquid-phase displacement, and extraction with the treating liquid acting as a solvent for the volatile liquid.

Heat is applied to the still to keep the treating liquid boiling. The amount of volatile liquid evaporated is controlled by the laws of equilibrium between liquid and vapor for the mixture of the particular treating liquid, such as water, and each specific solvent. The boiling treating liquid acts as a heat distributing medium and also as a dispersing medium for the immiscible or insoluble substance.

Since the non-volatile substance is insoluble or immiscible in the treating liquid and does not evaporate to any effective degree, this non-volatile substance is left in a finely divided suspension or dispersion in the treating liquid. Until so dispersed, this non-volatile substance does not come in contact with any heated surface on which it would form a deposit resistant to heat flow or be decomposed by contact with this heated surface. This leaves the heating surface in condition to maintain a high rate of heat transfer with a liquid of relatively low viscosity.

In the practice of the invention the mixture of vapors of the treating liquid and the volatile liquid preferably passes upward through a fractionating column which separates the treating liquid and the volatile liquid. The vapors from the top of the column are condensed in a surface condenser. Part of the condensate is preferably returned to the top of the column to serve as a reflux in the customary manner to make the separation of treating liquid and volatile liquid as complete as possible.

Some non-volatile substances remain in suspension in the boiling body of treating liquid while others settle to form a slurry in the cone bottom of the still, but in either form the suspension or slurry of the non-volatile substance, which contains a small percentage of the volatile liquid, is continuously withdrawn from the cone bottom of the still and is passed through a separator, such as a decanter, centrifuge or filter, in which the non-volatile substance is removed. The treating liquid, such as water, in the slurry so containing a small percentage of the volatile liquid is returned to the still to obtain maximum recovery of the volatile liquid. Substantially complete recovery of the volatile liquid from the material in process can be effected on shut down by stopping the flow of feed material while continuing the evaporation and recycling of the treating liquid through the separator and still.

Operation of the process for continuous recovery of the volatile liquid can readily be controlled by regulating the flow of the feed solution, the reflux and the flow of steam. These can be easily determined by placing automatic flow indicating devices in the feed line, the reflux line and the steam line.

The invention will first be described with the use of boiling water as the treating liquid and with a solution containing a water-insoluble solute and a solvent having a boiling point lower than water, a solution of cellulose acetate in acetone being selected as a specific example. However, the liquid being treated is not necessarily a solution but can also be a mixture of a non-volatile substance containing or contained in, a volatile liquid other than the treating liquid and insoluble therein. Also, as described later, volatile liquids are solvents having a boiling point higher than the treating liquid, such as water, can be recovered by the practice of the present invention. Such recovery of acetone as the volatile solvent from a solution containing cellulose acetate as a water-insoluble solute is effected in the apparatus shown in the accompanying drawings in which a still is designated generally at 10, a separator such as a filter at 11 and a surface condenser at 12.

The lower part of the still is shown as comprising a calandria or boiler indicated generally at 13 having an upright cylindrical outer shell 14 provided with horizontal tube plates 15 and 16 across its upper and lower ends, these tube plates being connected by and carrying a central down-take tube 18 and a surrounding series of smaller up-take tubes 19. The space 20 enclosed by the shell 14, tube plates 15 and 16 and tubes 18 and 19 is supplied with steam from a steam supply line 21 and the condensate is removed through a condensate drain line 22. The steam chest or space 20 of the calandria can also be provided with the usual valved vent 17. The calandria 13 is provided with a conical bottom 23 which tapers downwardly to a slurry outlet 24 connected with a slurry outlet line 25.

The upper part of the still 10 comprises the cylindrical shell 26 of a fractionating column indicated generally at 27, the lower flanged end of this shell being secured on the upper flange 28 of the calandria 13. The solution feed pipes 29 extends through the lower part of this shell 26, this solution feed pipe having, within the still, a downturned end 30 which discharges the solution downwardly against the surface of the turbulent body of boiling water contained within the calandria 13. The dilute liquid or filtrate from the separator or filter 11 can be fed to the still through a return or filtrate line 31 extending through the shell 26 below the solution feed pipe 29 and also having, within the still, a downturned end 32 which discharges the dilute filtrate downwardly into the body of boiling water contained in the calandria 13.

Above these pipes 29 and 31, the shell 26 is internally provided with one or more annular groups of brackets, each group of brackets carrying an annular supporting plate 34 and screen 35 for ceramic packing rings or other shapes 36 with which the upper part of the shell 26 is packed to provide a fractionating tower.

Above these shapes 36, a reflux line 38 extends through the shell 26 to discharge the reflux into the upper part of the fractionating column and the extreme top of the shell 26 is provided with a vapor outlet 39 connected by a vapor line 40 with the surface condenser 12.

The condensate from the surface condenser 12 is withdrawn through a line 41 by a pump 42 the outlet line 43 of which connects with the reflux line 38 and also with the line 44 returning the recovered acetone to the usual storage tank (not shown). The relative proportions of the distillate returned to process and for refluxing can be controlled by the valves shown in the corresponding reflux and return lines 38 and 44 and each of these lines can be provided with an automatic flow indicating device 45 and 46 for determining the flow in each. Similarly the solution feed line 29 is also preferably provided with an automatic flow indicating device 48 for determining the flow of solution fed to the apparatus and which is, of course, under control of the valve shown in the solution feed line 29.

The mixture in the calandria 13 containing the cellulose acetate in suspension and also containing a small percentage of acetone is withdrawn from the slurry outlet 25 of the still by a pump 50, the outlet line 51 of which discharges the slurry into the separator 11.

This separator can be of any suitable type such as a centrifuge, decanter or filter depending upon the material being handled, and is shown as a filter comprising a rectangular tank 55 having a series of upstanding ribs 56 at spaced intervals along its bottom, these ribs being provided along their bottom edges with semi-circular openings 58 to permit free flow of the filtrate along the bottom of the tank. On these ribs 56 and also on angle brackets 59 at opposite sides of the tank is supported a pair of rectangular perforated plates 60, these in turn supporting a rectangular screen 61. The plate 60 and screen 61 extend the full width and breadth of the tank 55. The slurry pipe 51 connects with an inlet 62 in one side wall of the tank 55 above the perforated plate 60 and screen 61 which retains the cellulose acetate present in the slurry in fibrous form. This fibrous cellulose acetate builds up on the screen 61 to form a filter cake, the water, containing a small percentage of acetone, passing through this filter cake and passing out through an outlet 63 in one side wall of the tank 55 below the screen 61 and perforated plate 60. The inlet line 64 of a filter pump 65 connects with the filter outlet 63, the discharge from this filter pump 65 connecting with the line 31 leading back to the still.

In the operation of the apparatus with cellulose acetate dissolved in acetone, the boiler or calandria 13 is filled with water to a level above the tubes 18 and 19 and below the lower ends of the pipes 30 and 32 and steam is admitted from the steam line 21 to the space 20 surrounding the down-take tube 18 and the smaller surrounding tubes 19. The water in the calandria is therefore brought to a boiling temperature and circulates through the calandria quite rapidly, the water flowing down through the downtake tube 18 and up through the smaller tubes 19.

The used acetone containing in solution cellulose acetate is then admitted through the feed line 29 into the still 10, this flow of feed solution being measured by the automatic flow indicating device 48. This feed solution is discharged within the still from the downturned end 30 of the solution feed pipe 29 onto the surface of the turbulent body of water boiling in the calandria 13. Since the acetone is volatile the acetone flashes out at or near the surface of the boiling water in the calandria 13 and, together with the water vapor generated by the boiling body of water in the calandria, passes up the fractionating tower forming the upper part of the still 10.

When the acetone so flashes out at or near the surface of the boiling water in the calandria 13, the cellulose acetate, being insoluble in water, separates in finely divided fibrous form in suspension in the boiling water, in which condition it does not prevent complete removal of the acetone and does not form a coating on the heating surface of the calandria. Instead these cellulose acetate fibers form a flocculent precipitate and are withdrawn from the conical bottom 23 of the calandria through the outlet pipe 25 by the slurry pump 50. This suspension contains water, the cellulose acetate in fibrous form, and a small percentage, in the order of 7%, of acetone.

With cellulose acetate in acetone, this desolventizing by evaporation is accompanied by extraction of the acetone by the boiling water from the fibrous cellulose acetate, the acetone being dissolved by the boiling water to extract it from the acetate. With other materials the desolventizing by evaporation, with or without concurrent extraction by dissolving of the volatile liquid into the treating liquid, will be accompanied by the liquid-phase separation in which the volatile liquid contained in the solid or liquid non-volatile substance is displaced by the treating liquid by preferential absorption of the treating liquid by the non-volatile substance, particularly where the volatile liquid is immiscible with the treating liquid. The evaporation may proceed first or simultaneously with the extraction or liquid-phase displacement, the order depending on the detention time necessary for extraction or to exchange the liquids absorbed and the volatility of the volatile liquid.

This mixture or slurry is delivered by the pump 50 through its discharge line 51 to the inlet 62 of the filter 11, this mixture or slurry being discharged on top of the screen 61 and perforated plate 60 of this filter. The fibrous cellulose acetate of the mixture or slurry is retained on the screen 61 and builds up as a filter cake thereon. The filtrate from the bottom of the filter 11 is withdrawn from the outlet 63 through the inlet 64 of the filter pump 65 which discharges the filtrate through the line 31. The downturned end 32 of this filtrate line 31 discharges the filtrate back into the body of boiling water contained within the calandria 13 to evaporate the acetone remaining in the filtrate. Any loss of water in the filter cake or condensate discharge into the filter can be made up by adding fresh water in the filter.

The mixed water and acetone vapor flows up through the fractionating column 27 of the still 10 and is rectified on passing the packing rings 36, the condensed water-acetone solution in equilibrium with the vapors returning to the calandria 13 and the enriched acetone vapors flowing out through the vapor outlet 39 into the vapor line 48 leading to the surface condenser 12. The condensed acetone is withdrawn from the surface condenser through the line 41 by the pump 42. The discharge line 43 from this pump 42 delivers a part of this acetone into the reflux line 38 from which it is discharged into the top of the still 10 as reflux, this flow being measured by the automatic flow indicating device 45. The other part of the acetone from the discharge line 43 of the pump 42 is returned to process or storage through the acetone return line 44, this flow of acetone being measured by the automatic flow indicating device 46.

The operation of the process is controlled by regulating the flow of feed liquid through the valve provided in the feed line 29 and determined by the automatic flow indicating device 48; by the flow of the reflux controlled by the valve in the reflux line 38 and determined by the automatic flow indicating device 45, and by the steam flow to the calandria.

On shut down, say, at the end of the day's run, the flow of material to the still through the feed line 29 can be cut off and operation of the still continued to evaporate substantially all of the acetone from the body of boiling water in the still. At the same time, the filter cake in the filter 11 is being washed with progressively purer water so that no substantial amount of acetone is retained in the filter cake and which can be burned or otherwise disposed of.

While not essential, it is, of course, desirable to use water as the boiling heat distributing and dispersing liquid, but if desired, particularly in providing a treating liquid in which the non-volatile substance is insoluble, another treating liquid can, of course, be employed. In the event that the boiling point of the volatile solvent liquid is higher than the boiling point of water, it is possible to practice the invention as previously described in detail by adding salt or a similar medium to the body of boiling water in the still to raise its boiling point above that of the volatile liquid. However, as previously indicated, it is not essential that the boiling treating liquid, such as water, have a boiling point higher than the volatile liquid or solvent to be recovered, the recovery under such circumstances involving the following modification, as shown in the drawings, of the illustrated apparatus:

Where boiling water is employed as the heat distributing and dispersing medium with a mixture or solution having a non-volatile substance or component contained in a volatile liquid having a boiling point higher than water, the boiling point of the volatile liquid is higher than the temperature of the still itself and in consequence the volatile liquid does not flash off on striking the surface of the boiling water and mixes with the water to a considerable extent before it evaporates. The vapors generated are in equilibrium with the liquid from which they are developed and therefore the percentage of water vapor in the vapor mixture is higher than in the liquid. For this reason it is desirable, in the recovering of the volatile liquid having a boiling point higher than water, to use live steam in addition to the steam admitted to the steam chest 20, to obtain steam distillation as well as direct evaporation and to provide a sufficient quantity of vapor to carry off all of the volatile component of the feed liquor. To this end a horizontal steam coil $a$ is submerged in the boiling body of water contained in the calandria 13 and is arranged above the upper tube plate 15. This steam coil can be supplied with steam from a steam inlet $b$ and is provided with a series of perforations $c$ so as to discharge live steam into the boiling mixture of water and the mixture or solution being treated.

To recover such higher boiling point volatile liquid from the still, a baffle $d$ is provided across the interior of the shell 26 near its lower end, this baffle having an opening $e$ through which the vapors generated in the still escape upwardly. Around this opening the baffle $d$ is provided with an upstanding vapor tube $f$ to retain the condensate, comprising a volatile liquid-water mixture enriched in the higher boiling point volatile liquid, flowing from the fractionating tower. The volatile liquid enriched mixture so collecting on the baffle $d$ can be withdrawn through an outlet pipe $g$. The outlet pipe $g$ can also be provided with a valved branch $h$ leading back to the still between the calandria 13 and the baffle $d$ so that if a still with this baffle is to be used with a solution containing a volatile liquid having a boiling point lower than water, the water collecting on the basin provided by the baffle $d$ returns directly to the calandria.

With the higher boiling point volatile liquid concentrate withdrawn at $g$, the condensate from the surface condenser 12 is substantially pure water which is returned to the calandria 13. For this purpose the outlet line 44 from this surface condenser can be connected by a valved branch line $j$ with the filtrate return line 31 from the filter.

For the purpose of stripping or providing high concentration of the volatile liquid withdrawn through the outlet pipe $g$, the vapor tube $f$ is continued up through an opening $k$ provided in the lower disk 34 and its screen 35 for supporting the packing 36 of ceramic rings and extends upwardly into this packing and is shown as closed at its upper end, as indicated at $l$, the vapor escaping through side openings $m$ which are screened as indicated at $n$. The upper end of the vapor tube $f$ is arranged at the optimum level for introduction of the mixed vapors from the calandria into the packing 36 and to strip or enrich the condensate collecting on the baffle $d$ a steam coil $o$ is submerged in the condensate collecting on this baffle, steam being supplied to this coil $o$ from a steam supply line $p$. As will be understood the downflowing liquid in the contacting zone or ceramic shapes 36 just above the pool on the baffle $d$, containing a little water and mostly the higher boiling point volatile liquid to be recovered, reacts thermodynamically with the vapor of the volatile liquid evolved from this pool by the steam coil $o$, evaporating the liquid water and condensing the corresponding amount of higher boiling point volatile liquid vapor, the relative amounts of steam evolved and higher boiling point volatile liquid condensed being in proportion to their latent heats. The higher boiling point volatile liquid vapor thus becomes diluted with steam. This process, repeating in successively higher zones of the tower, and in each zone proceeding towards equilibrium composition of liquid and vapor, augments the steam in the vapor to more and more and diminishes the higher boiling point volatile liquid vapor to less and less until at the level of the upper end of the vapor tube $f$ the composition of the vapor rising from the pool on the baffle $d$ is of approximately the same composition as the vapor coming from the openings $m$.

With the apparatus so modified for the use of a body of boiling water in the recovery of a volatile liquid component having a boiling point higher than water from a mixture or solution, the vapors leaving the top of the fractionating tower through the vapor outlet 39 consist of practically pure water and are condensed in the surface condenser 12. Part of this water is returned, as reflux, through the line 38 to the top of the tower and the balance is returned to the still through the line $j$.

From the foregoing it will be seen that the present invention provides for the simple, economical and practically complete recovery of volatile liquid components from mixtures, or solutions containing non-volatile substances and in which the difficulty from coated heating surfaces is eliminated. It will be appreciated that many modifications of the invention can be made and that it can be practiced with mixtures and solutions other than those enumerated. The invention is therefore not limited to the specific apparatus and operation described, but is to be accorded the full range of equivalents comprehended by the accompanying claim.

I claim:

The continuous process of desolventizing materials insoluble in a treating liquid and containing a volatile solvent different from said treating liquid, which comprises maintaining a boiling body of said treating liquid, passing said materials through said body in intimate contact with said boiling treating liquid, supplying heat to said body to maintain a boiling condition thereof and to evaporate said solvent at substantially the same rate as it is supplied with said materials, removing mixed treating liquid vapor and solvent vapor from said body and fractionally distilling said vapors to separate said solvent vapors from said treating liquid, returning said separated treating liquid to said body, condensing said separated solvent papers, applying as a reflux a part of said separated and condensed solvent papers to said mixed treating liquid vapor and solvent vapor being fractionally distilled, continuously withdrawing a portion of said body of treating liquid containing said materials in suspension, separating said materials from said withdrawn portion of treating liquid in the form of a filter cake through which said withdrawn portion of treating liquid is continuously passed to wash said filter cake, and continuously returning said portion of treating liquid after passing through said filter cake to said body for further evaporation of residual solvent contained therein and for repeated contacting with the materials to be desolventized.

GUY N. HARCOURT.

REFERENCES CITED

The following references are of record in the file of this patent:

UNITED STATES PATENTS

| Number | Name | Date |
| --- | --- | --- |
| 2,138,048 | Vesce | Nov. 29, 1938 |
| 2,151,990 | Ruys | Mar. 28, 1939 |
| 2,185,868 | Schaefer | Jan. 2, 1940 |
| 2,315,422 | Hildebrandt | Mar. 10, 1943 |
| 2,342,419 | Martin | Feb. 22, 1944 |
| 2,395,901 | Murphree | Mar. 5, 1946 |
| 2,406,648 | Weisberg et al. | Aug. 27, 1946 |
| 2,417,131 | Schmitt | Mar. 11, 1947 |

OTHER REFERENCES

Ernest Guenther, "The Essential Oils." (c) 1948 by D. Van Nostrand Company, Inc., New York, pp. 147–149.